US011581798B2

(12) United States Patent
Freeman (10) Patent No.: US 11,581,798 B2
(45) Date of Patent: Feb. 14, 2023

(54) SUPPRESSING DOUBLE-FREQUENCY RIPPLE POWER IN SINGLE-PHASE POWER CONVERTERS

(71) Applicant: EAST WEST MANUFACTURING, LLC, Atlanta, GA (US)

(72) Inventor: Belvin Freeman, Asheville, NC (US)

(73) Assignee: East West Manufacturing, LLC, Atlanta, GA (US)

( * ) Notice: Subject to any disclaimer, the term of this patent is extended or adjusted under 35 U.S.C. 154(b) by 13 days.

(21) Appl. No.: 17/150,191

(22) Filed: Jan. 15, 2021

(65) Prior Publication Data
US 2021/0218325 A1    Jul. 15, 2021

Related U.S. Application Data

(60) Provisional application No. 62/961,479, filed on Jan. 15, 2020.

(51) Int. Cl.
*H02M 1/14* (2006.01)
*H02M 1/00* (2006.01)
(Continued)

(52) U.S. Cl.
CPC .............. *H02M 1/14* (2013.01); *H02M 1/007* (2021.05); *H02M 1/143* (2013.01); *H02M 1/15* (2013.01);
(Continued)

(58) Field of Classification Search
CPC .......... H02M 1/14; H02M 1/143; H02M 1/15; H02M 1/007; H02M 1/0067; H02M 7/44; H02M 7/53871
See application file for complete search history.

(56) References Cited

U.S. PATENT DOCUMENTS 5,115,185 A  *  5/1992  Fraidlin ............ H02M 3/33507
                                                363/45
6,424,207 B1     7/2002  Johnson
(Continued)

OTHER PUBLICATIONS

Extended European Search Report dated Jun. 11, 2021 in the corresponding European Application No. 21151801.4, 9 pages.

*Primary Examiner* — Gary L Laxton
(74) *Attorney, Agent, or Firm* — Smith, Gambrell & Russell, LLP (57) ABSTRACT

A method is provided for limiting double-frequency internal power distortion in a power system. The method includes receiving an input voltage from a voltage source at a power converter from which an output power is provided to an electrical load, measuring the output power having a waveform with a steady-state component and a double-frequency transient component, executing computer-readable program code, via processing circuitry, to determine a compensating waveform equal in amplitude to the double-frequency transient component, and that is anti-phase to the double-frequency transient component, and causing the power converter to generate the compensating waveform such that the waveform and the compensating waveform superpose, and the double-frequency transient component of the waveform and the compensating waveform destructively interfere, leaving the steady-state component that is delivered to the electrical load.

20 Claims, 4 Drawing Sheets

(51) Int. Cl.
*H02M 7/44* (2006.01)
*H02M 7/5387* (2007.01)
*H02M 1/15* (2006.01)

(52) U.S. Cl.
CPC ......... *H02M 7/44* (2013.01); *H02M 7/53871* (2013.01); *H02M 1/0067* (2021.05)

(56) References Cited

U.S. PATENT DOCUMENTS

| | | | |
|---|---|---|---|
| 9,531,317 B2 * | 12/2016 | Kudoh | H02M 5/297 |
| 9,716,433 B2 | 7/2017 | Coleman et al. | |
| 10,454,366 B1 * | 10/2019 | Li | H02M 1/4233 |
| 2009/0097283 A1 | 4/2009 | Krein et al. | |
| 2011/0026281 A1 | 2/2011 | Chapman et al. | |
| 2012/0087159 A1 * | 4/2012 | Chapman | H02M 7/48 363/41 |
| 2014/0111001 A1 | 4/2014 | Miliani | |
| 2019/0319550 A1 * | 10/2019 | Watanabe | H02M 7/537 |

\* cited by examiner

SUPPRESSING DOUBLE-FREQUENCY RIPPLE POWER IN SINGLE-PHASE POWER CONVERTERS

CROSS REFERENCE TO RELATED APPLICATIONS

This application claims the benefit of U.S. Provisional Patent Application Ser. No. 62/961,479, Suppressing Double-Frequency Ripple Power In Single-Phase Power Converters, filed 15 Jan. 2020, the contents of which are hereby incorporated by reference.

TECHNOLOGICAL FIELD

The present disclosure relates generally to the field of single-phase power conversion systems, and specifically to suppressing double-frequency ripple power in single-phase power converters.

BACKGROUND

Single-phase power converters routinely experience strong double-frequency internal power flows. These power flows may induce extra losses and component stress, so suppressing these power flows would be highly desirable. Load power under single-phase conditions typically contains a steady (DC) component and a fluctuating double-frequency (AC) component. With many loads, a simple DC plus 2-f model fully characterizes the energy flow. However, this disclosure may further be applied to the average plus harmonic frequency component of more complex loads.

In a traditional single-phase inverter design lacking double-frequency ripple power suppression, the DC voltage level of the intermediate storage device (typically a capacitor) may be controlled to an average level that supports AC voltage modulation of the inverter. In such a design, some fraction of the double-frequency ripple power component may flow to the DC energy source.

The voltage of the intermediate DC device may be controlled to a useful level. In the simplest approach, that average voltage may be controlled to be a constant value. Then, double-frequency ripple power may be transmitted to the DC voltage source. This induces added losses and component stress at that source. A preferable alternative would draw energy from the source as a steady flow without ripple.

In traditional approaches, the double-frequency ripple power flows may be cancelled by circuit-based methods. Such methods involve physical construction of additional external circuit components which exchange energy to compensate the power ripple. This approach can be inflexible and add extra components during manufacturing. In other traditional approaches, a power converter may be controlled to suppress the double-frequency ripple power component at the DC source by controlling the output current injected into the grid to cancel the source ripple. This disclosure, in contrast, presents a ripple-power suppression technique that is entirely internal to the power generating device, having no consequences to any external connections.

BRIEF SUMMARY

Example implementations of the present disclosure are directed to the field of single-phase power conversion systems, and specifically to suppressing double-frequency ripple power in single-phase power converters. The present disclosure includes, without limitation, the following example implementations.

This disclosure presents a software-based solution to the problem of double-frequency ripple power in single-phase power converters. The solution involves adding a secondary modulation to the PWM signals naturally used internally in single-phase power sources. The software-based (algorithmic) solution increases flexibility, requires no additional circuit components, and achieves equivalent performance to other circuit-based approaches.

Some example implementations provide a method for limiting double-frequency internal power distortion in a power system, the method comprising: receiving an input voltage from a voltage source at a power converter from which an output power is provided to an electrical load; measuring the output power having a waveform with a steady-state component and a double-frequency transient component; executing computer-readable program code, via processing circuitry, to determine a compensating waveform equal in amplitude to the double-frequency transient component, and that is anti-phase to the double-frequency transient component; and causing the power converter to generate the compensating waveform such that the waveform and the compensating waveform superpose, and the double-frequency transient component of the waveform and the compensating waveform destructively interfere, leaving the steady-state component that is delivered to the electrical load.

In some example implementations of the method of any preceding example implementation, or any combination of any preceding example implementations, the power system includes a capacitor connected to and between the power converter and the electrical load.

In some example implementations of the method of any preceding example implementation, or any combination of any preceding example implementations, the output power is measured on an output side of the capacitor.

In some example implementations of the method of any preceding example implementation, or any combination of any preceding example implementations, measuring the output power comprises: measuring a voltage across the capacitor, and a current across the capacitor; and determining the output power from the voltage and the current.

In some example implementations of the method of any preceding example implementation, or any combination of any preceding example implementations, the computer-readable program code is executed to implement an equivalent circuit to express and thereby determine the compensating waveform, each correction signal in the equivalent circuit corresponding to a respective signal in the power system.

In some example implementations of the method of any preceding example implementation, or any combination of any preceding example implementations, the correction signal is equal in amplitude and anti-phase to the respective signal that is the double-frequency transient component of the waveform of the output power.

In some example implementations of the method of any preceding example implementation, or any combination of any preceding example implementations, the equivalent circuit is a double-frequency circuit having an alternating current (AC).

In some example implementations of the method of any preceding example implementation, or any combination of any preceding example implementations, the steady-state component is delivered to the electrical load as a sinusoidal voltage.

In some example implementations of the method of any preceding example implementation, or any combination of any preceding example implementations, the power system includes a capacitor connected to and between the power converter and the electrical load, and a power inverter connected to and between the capacitor and the electrical load, and the sinusoidal voltage is delivered to the electrical load from the power inverter.

Some example implementations provide a power system comprising: a power converter configured to receive an input voltage from a voltage source, and provide an output power to an electrical load; and processing circuitry coupled to the power converter, the processing circuitry configured to at least perform the method of any preceding example implementation, or any combination of any preceding example implementations.

Some example implementations provide a computer-readable storage medium for limiting double-frequency internal power distortion in a power system that includes a power converter configured to receive an input voltage from a voltage source, and provide an output power to an electrical load, the computer-readable storage medium being non-transitory and having computer-readable program code stored therein that, executed by processing circuitry, causes the processing circuitry to at least perform the method of any preceding example implementation, or any combination of any preceding example implementations.

These and other features, aspects, and advantages of the present disclosure may be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It may therefore be appreciated that this Brief Summary is provided merely for purposes of summarizing some example implementations so as to provide a basic understanding of some aspects of the disclosure. Accordingly, it may be appreciated that the above described example implementations are merely examples and should not be construed to narrow the scope or spirit of the disclosure in any way. Other example implementations, aspects and advantages may become apparent from the following detailed description taken in conjunction with the accompanying figures illustrating, by way of example, the principles of some described example implementations.

BRIEF DESCRIPTION OF THE FIGURES

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and may fully convey the scope of the disclosure to those skilled in the art. For example, unless otherwise indicated, reference to something as being a first, second or the like should not be construed to imply a particular order. Also, while reference may be made herein to quantitative measures, values, geometric relationships or the like, unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to the field of single-phase power conversion systems, and specifically to suppressing double-frequency ripple power in single-phase power converters.

The present disclosure is directed to solving the problem of double-frequency ripple power by minimizing its transmission from the DC source. This reduces stress on the DC voltage source, and correspondingly extends the source life, reduces losses, and permits use of lower tolerance circuit components. A power inverter may be implemented in the present disclosure and may be classified as a voltage-source-inverter (VSI), which may be designed to produce a low-harmonic sinusoidal output voltage waveform independent of the current drawn at the connection. The output current may be determined by the connection rather than by the inverter. In conventional systems it may be significantly non-sinusoidal, and the power delivered may be unpredictable, and the connected system may be an isolated load, weak microgrid, or strong grid.

While the output power may be uncontrolled, it may also be measured via voltage and current sensors. As such, the needed source ripple cancellation requirement may be computable. In some examples, an algorithm(s) may be implemented to control the power transfers at various points in the system by pulse-width modulation (PWM) of the power converters.

In some example implementations, an intermediate storage device, such as a DC bus capacitor, may be used as a ripple buffer device configured to extract DC current from the source (free of double-frequency ripple), and outputting power likely to contain double-frequency ripple, the mismatch of those two waveforms creates complex power flow at the DC bus. Consequently, the voltage at the DC bus capacitor may be allowed to fluctuate and absorb the power imbalance. Under software control, the bus voltage can be modulated in the manner needed to cancel the double-frequency ripple at the source. The modulation may be predicted and synthesized algorithmically by software means. This may achieve multiple operating objectives: constant source current, purely sinusoidal output voltage (VSI operation), and meeting the output current needs of a particular connection without creating additional distortion.

In some example implementations, the modulation pattern present in the power converter (DC-to-DC converter) of the power system may be modified to include a double-frequency component which suppresses the double-frequency ripple power component flowing from the DC source. Such cancellation may be achieved by software methods (e.g., computer-readable program code executed by processing circuitry) and naturally combined into the existing design of modulated power converters (DC-to-DC converters). Furthermore, the cancellation of the double-frequency ripple may be performed with sinusoidal output voltage being the only design objective, with output current and power being uncontrolled.

In some examples, energy may first be converted from an uncontrolled DC voltage source to a controlled DC voltage level in an intermediate storage device, and in a second conversion from the controlled DC voltage level to an AC load. The first conversion device may be referred to as a power converter or a DC-to-DC converter, and the second device a power inverter or a DC-to-AC inverter. The present disclosure describes a software control method to eliminate double-frequency currents at the DC source.

Figure 1:
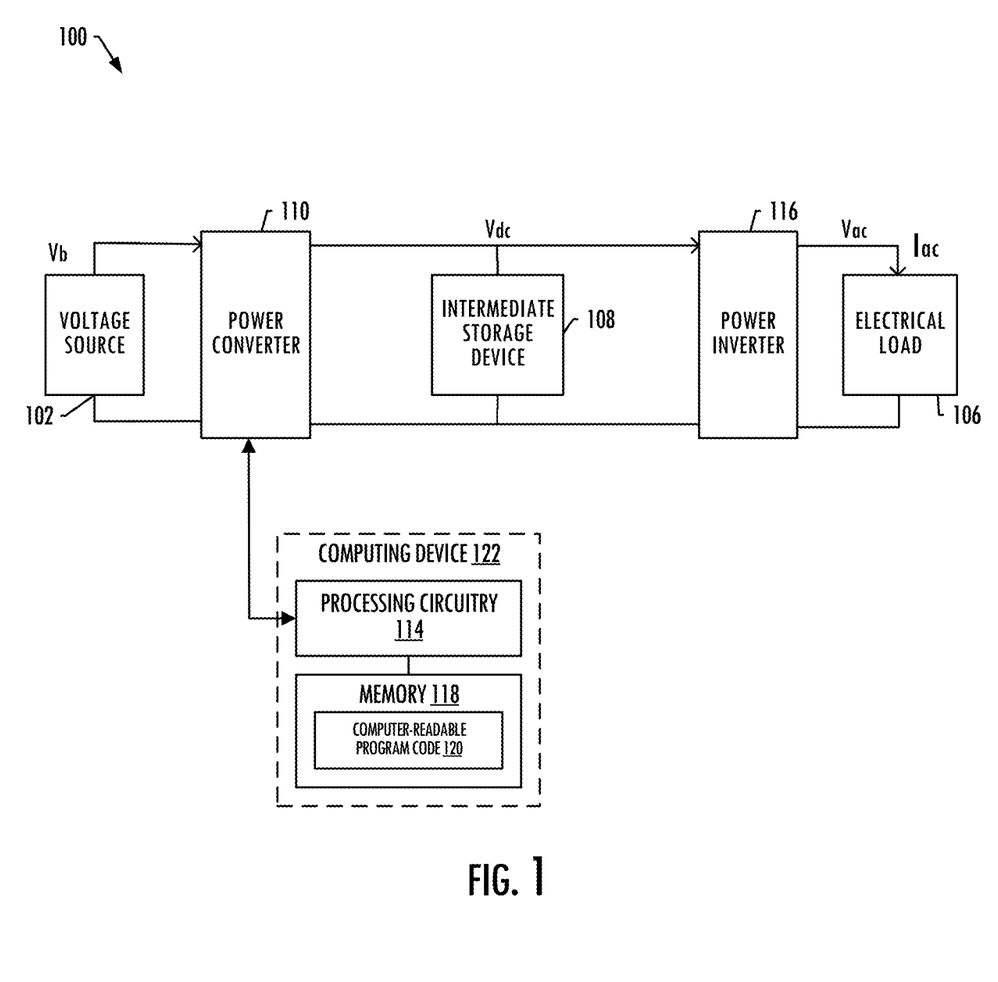
FIG. 1 illustrates a power system, according to example implementations.

FIG. 1 shows a diagram of a power system 100, which may be a single-phase serial DC-to-DC plus DC-to-AC power system, according to example implementations. As shown, there is a voltage source 102 with a voltage $V_b$. The voltage source may be any type of source with generally steady voltage, e.g., a DC source. Because the voltage level of the voltage source may not be compatible with that of an electrical load 106, a voltage conversion may be applied to shift the voltage, e.g., by DC-to-DC conversion, to a desirable voltage level on an intermediate storage device 108. In some examples, the intermediate storage device may be a DC bus capacitor. The voltage levels of the voltage source and the intermediate storage device may be set according to the requirements of the power system and the electrical load, with appropriate buck or boost conversion applied as appropriate.

In some examples, a power converter 110 may regulate the voltage of the intermediate storage device 108 by controlling a power converter modulation index through a feedback controller, which may be within or operatively connected to processing circuitry 114, sensing the voltage of the intermediate storage device. In this regard, the average voltage is regulated, and the current into the intermediate storage device may have a double-frequency ripple current injected into the DC bus by a single-phase load. In these examples, the voltage source 102 may therefore experience a double-frequency power ripple. Also in these examples, a power inverter 116 may be classified as a current-source-inverter (CSI).

The power converter 110 may be configured to receive the voltage $V_b$ as an input voltage from the voltage source 102, and provide an output power to the electrical load 106. In some examples, the power converter may apply a high-frequency switching modulation (higher than the frequency supplied to the electrical load, e.g., 60 Hz in U.S. systems) during the voltage conversion process. High-frequency ripple signals associated with these modulations may be conventionally filtered by the design of circuitry in a power system; however, the present disclosure is directed to the low-frequency harmonics of a signal (e.g., an AC signal) applied to the electrical load.

In some examples, the processing circuitry 114 of the power system 100 is coupled to the power converter 110 and is configured to at least measure the output power having a waveform with a steady-state component and a double-frequency transient component. In some instances, the steady-state component may be referred to as an output component, and the double-frequency transient component may be referred to as a double-frequency component. The processing circuitry may be further configured to access memory 118 to execute computer-readable program code 120 to determine a compensating waveform equal in amplitude to the double-frequency transient component, and that is anti-phase to the double-frequency transient component.

In some examples, power system 100 may include a computing device 122 containing the memory 118 with the computer-readable program code 120 stored therein, and the processing circuitry configured to access the memory and configured to execute the computer-readable program code. The computing device may be configured to implement, by the processing circuitry, real-time measurement and control in the power system that permits the computation and imposition of a compensating modulation to cancel the ripple power that would otherwise be transmitted. The real-time measurement and control may be implemented as an algorithm that is used to derive the correct compensating converter modulation. The algorithm may also be used to cancel other harmonic distortion transmitted.

The processing circuitry 114 may also be configured to cause the power converter 110 to generate the compensating waveform such that the waveform and the compensating waveform superpose, and the double-frequency transient component of the waveform and the compensating waveform destructively interfere, leaving the steady-state component that is delivered from the electrical source 102 to the electrical load 106. In this example, this destructive interference results in internal steady power flow despite varying power that may be delivered to the electrical load.

In some examples, the intermediate storage device 108 of the power system 100 is connected to and between the power converter 110 and the electrical load 106. And the processing circuitry 114 may be configured to measure the output power on an output side of the intermediate storage device, which includes the processing circuitry configured to measure a voltage and a current across the intermediate storage device, and determine the output power from the voltage and the current.

Figure 2:
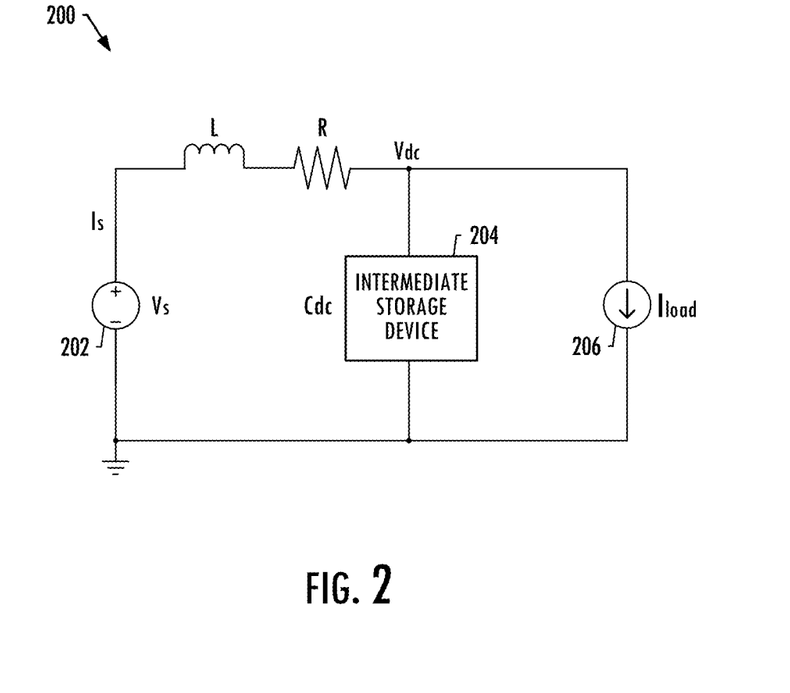
FIG. 2 illustrates an example equivalent circuit for implementation in the power system, according to example implementations.

In some examples, the computer-readable program code 120 is executed to implement an equivalent circuit 200, as shown in FIG. 2, to express and thereby determine the compensating waveform, each correction signal in the equivalent circuit corresponding to a respective signal in the power system 100. The equivalent circuit may be a double-frequency circuit utilizing AC. In these examples, each correction signal is equal in amplitude and anti-phase to its respective signal that is the double-frequency transient component of the waveform of the output power. By this implementation of the equivalent circuit to express the compensating waveform, and the double-frequency transient component of the waveform and the compensating waveform destructively interfere, thereby leaving the steady-state component that is extracted from the voltage source 102 delivered to the electrical load 106 as an output component having a sinusoidal voltage. In some examples, the power inverter 116 is connected to and between the intermediate storage device 108 and the electrical load 106, the power inverter configured to deliver the sinusoidal voltage to the electrical load.

As previously explained, according to some example implementations, the intermediate storage device 108 may be a DC bus capacitor or any other energy storage device. The intermediate storage device may provide a steady voltage sufficiently high to serve as an inverter reference, and its voltage may be controlled by voltage converter modulation (e.g., DC-to-DC), which may involve baseband signals averaged over a switching period—the switching waveform may have a higher frequency.

Figure 3:
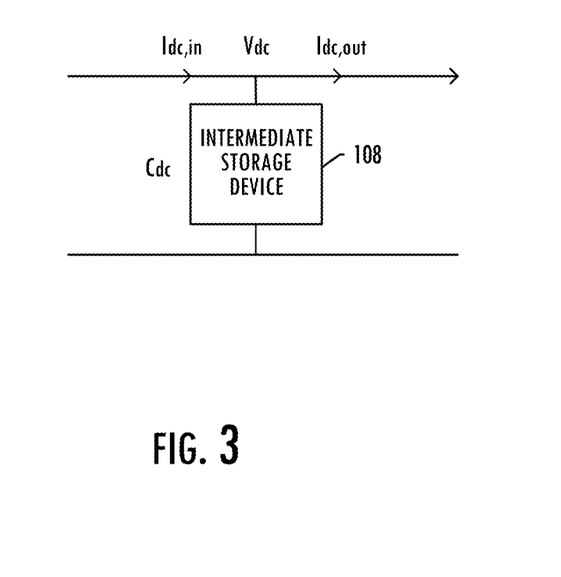
FIG. 3 illustrates further details of an intermediate storage device of the power system, according to example implementations.

As shown in FIG. 3, the voltage of the intermediate storage device 108 may be affected by two current flows—an input current from a power converter side, $I_{dc,in}$ and an output current to an electrical load side, $I_{dc,out}$. The bus voltage $V_{dc}$ may change in response to the net current according to the equation:

$$V_{dc}(t) = \frac{I_{dc,in}(t) - I_{dc,out}(t)}{sC_{dc}} \quad \text{Eq (1)}$$

The load draw may be examined under a condition of sinusoidal output at a power factor angle, $\phi$. This is a representative example of sinusoidal device operation, but the function of the ripple power compensation algorithm is not limited to this example. In examples involving nonlinear loads containing strong harmonic content, the ripple power compensation algorithm may respond principally to the double-frequency harmonic, which is expected to be the strongest ripple power variation, and the ripple cancellation techniques of the present disclosure may be extend to any type of distorted waveform.

In examples pertaining to steady-state sinusoidal load operation, an output voltage $V_{ac}$ at the power inverter 116 has a waveform at a selected frequency (e.g., 60 Hz in US systems), with an angular frequency $\omega=2\pi(60)$, and may be calculated according to the equation:

$$V_{ac}(t) = V_0 \cos(\omega t) \quad \text{Eq (2)}$$

A current $I_{ac}$ may have a waveform with possible power angle $\phi$, and be calculated according to the equation:

$$I_{ac}(t) = I_0 \cos(\omega t + \varphi) \quad \text{Eq (3)}$$

The instantaneous output power to the electrical load 106 may be calculated as follows in a load power equation:

$$P_{out}(t) = V_{ac}(t) \times I_{ac}(t) \quad \text{Eq (4)}$$
$$= \frac{V_0 I_0}{2} \cos(\varphi) + \frac{V_0 I_0}{2} \cos(2\omega t + \varphi)$$

That is, the output power $P_{out}$ in this example contains a steady component and a double-frequency component. The instantaneous power transferred to the load in this example is equal to the power transfer on the output side of the intermediate storage device 108, according to the equation:

$$P_{dc,out}(t) = P_{out}(t) \quad \text{Eq (5)}$$
$$= V_{dc}(t) \times I_{dc,out}(t)$$

That is, in this example, the output power transfer at the intermediate storage device 108 is equal to the instantaneous product of the intermediate storage device voltage $V_{dc}$ and the output current $I_{dc,out}$. In this regard, the intermediate storage device 108 is large enough that the voltage ripple is much smaller than the average intermediate storage device voltage. In Eq (5), the intermediate storage device voltage may be approximated as being constant, in accordance with Eq (6).

$$V_{dc}(t) \sim V_{DC} \quad \text{Eq (6)}$$

From this, the output current at the intermediate storage device 108 may be derived according to the equation:

$$I_{dc,out}(t) = \frac{P_{out}(t)}{V_{DC}} \quad \text{Eq (7)}$$

By inserting the load power equation of Eq (4), it may be determined that during steady-state sinusoidal inverter operation, the current drawn by the electrical load 106 at the intermediate storage device 108 has both steady and double-frequency content.

Returning to the equivalent circuit 200 of FIG. 2, instead of regulating just the average voltage of the intermediate storage device 108, the modulation of the power converter 110 can additionally impose a double-frequency compensation. Expressing this modulation as an AC voltage source 202 having a voltage $V_s$, in this example, the equivalent circuit is projected as an AC circuit at the double frequency, the AC circuit containing an inductor L and a resistor R as an LR series connected to the voltage source 202, an intermediate storage device 204, and a current source 206. In this regard, the load current $I_{load}$ may be equal to the double-frequency portion of the intermediate storage device output current, which was shown as $I_{dc,out}$ in FIG. 3 and Eq. 7. The intermediate storage device voltage $V_{dc}$, may be equal to the double-frequency portion of the full intermediate storage device voltage, shown as $V_{dc}$ in FIG. 3 and Eq. 5. Similarly, the correction signals shown in FIG. 2 may be the double-frequency AC component of a full circuit—modeled in this example as a superposition of the DC and double-frequency AC circuits of the power system 100.

The voltage $V_s$ of the equivalent AC voltage source 202, which may also be referred to as a compensating voltage or a designed AC modulating voltage, may suppress double-frequency power ripple at the voltage source 102. From the double-frequency equivalent AC circuit, it may be determined that the ripple current $I_s$, or equivalently the ripple power (the product of $V_s \times I_s$), are cancelled by the condition shown in Eq (8):

$$v_s(t) = v_{dc}(t) \quad \text{Eq (8)}$$

That is, in this example, when there is no double-frequency voltage difference between these two points of the power converter 110, then there will be no current (or power) flow at the double frequency.

The conditions of Eq (8) may be achieved in various ways. For example, measuring the output voltage and load current, the DC capacitor ripple $V_{dc}$ may be determined by executing the computations of Eqs (4) and (5). Alternatively, the current ripple $I_s$ may be measured and a feedback regulator may be constructed to drive this signal to zero.

The voltage $V_s$ may be derived and imposed algorithmically without additional components. An algorithm, which may be implemented in software, may be used to derive the compensating voltage, which may be scaled to an equivalent pulse-width modulation (PWM) and imposed through the power converter 110. Additionally, the algorithm may be used to cancel any harmonic disturbance that may propagate to the DC source while supporting different types of loads.

Figure 4:
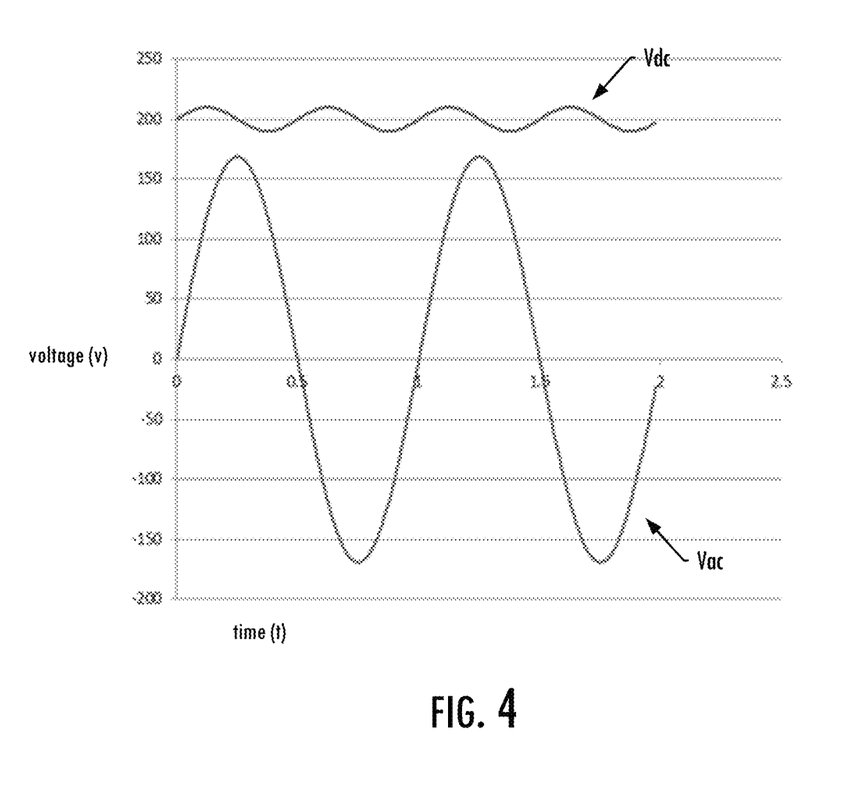
FIG. 4 illustrates expected circuit voltage behavior when implementing ripple suppression, according to example implementations.

FIG. 4 illustrates an example of expected circuit voltage behavior when implementing the ripple suppression of the present disclosure. The intermediate storage device voltage $V_{dc}$ may be distorted by a small double-frequency ripple; however, the voltage swings are not large enough to prevent making an undistorted output AC voltage sinusoid $V_{ac}$. The source current may become steady, with no double-frequency ripple, and the output current may be determined by the type of externally connected electrical load or power system. The ripple suppression technique may also be applicable to single-phase DC-to-DC/DC-to-AC applications with the power inverter 116 connected to an isolated electrical load, weak grid, or strong grid.

Figure 5:
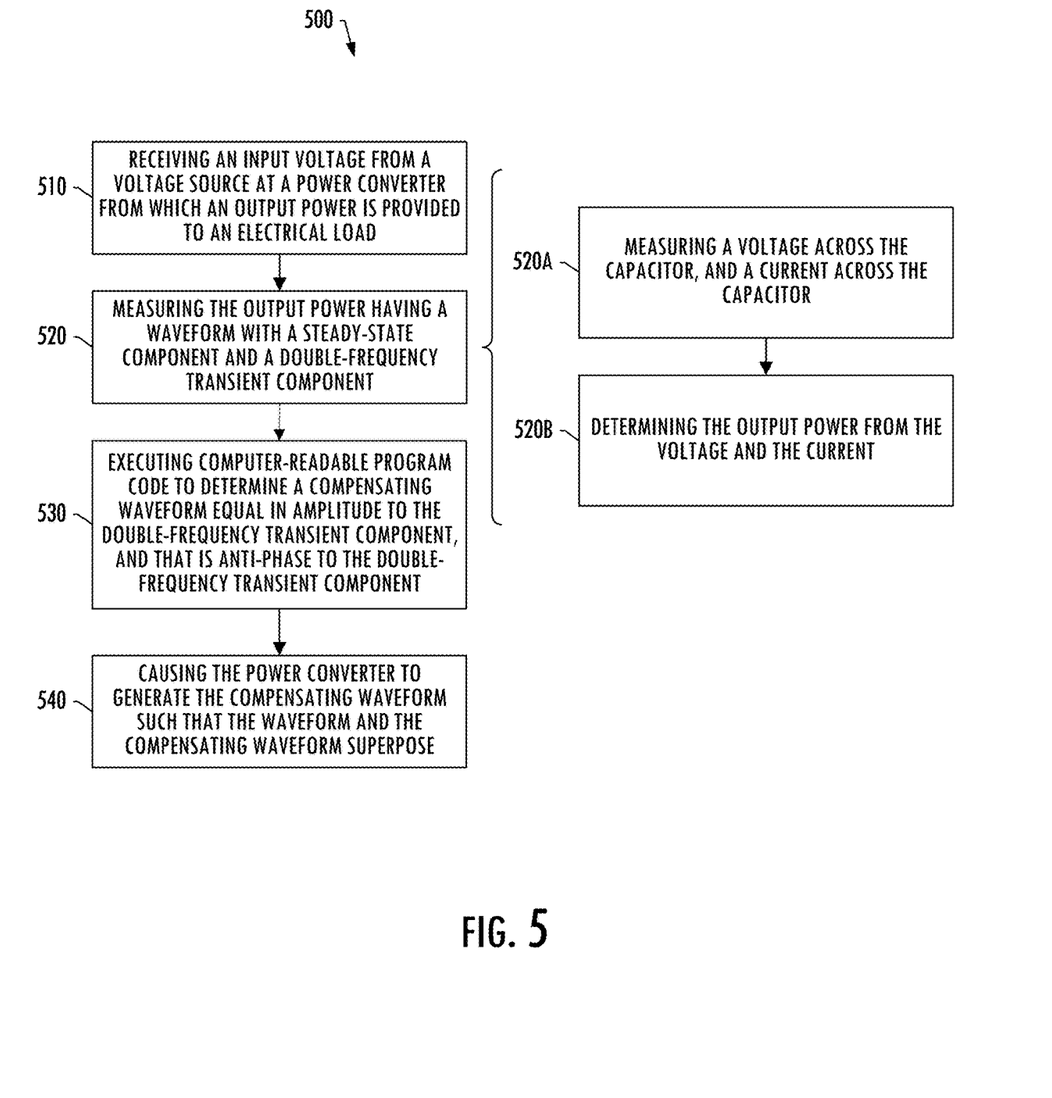
FIG. 5 is a flowchart illustrating various steps in a method for limiting double-frequency internal power distortion in the power system, according to example implementations.

FIG. 5 is a flowchart illustrating various steps in a method 500. For illustrative purposes, method 500 may be discussed with reference to the steps being performed in accordance with the power system 100 shown in FIGS. 1-3. Additionally, while FIG. 5 shows an example implementation of method 500, other example implementations of method 500 may contain fewer or more steps. Further, while in some example implementations the steps of method 500 may be performed as shown in FIG. 5, in other example implementations the steps may be performed in a different order, or certain steps may occur simultaneously with one or more other steps. Portions of method 500 may be implemented as a series of modules, which may function in concert with electronic devices. Such modules may be utilized separately and/or together, locally and/or remotely to form a program product thereof.

Method 500 may be used for limiting double-frequency internal power distortion in the power system 100. As shown, step 510 may include receiving an input voltage $V_b$ from a voltage source 102 at a power converter 110 from which an output power is provided to an electrical load 106. Step 520 may include measuring the output power having a waveform with a steady-state component and a double-frequency transient component. Step 520A may be included in step 520 for measuring a voltage across the intermediate storage device 108 and a current across the intermediate storage device. Step 520B may also be included in step 520 for determining the output power from the voltage and the current.

Step 530 of method 500 may include executing computer-readable program code 120, via processing circuitry 114, to determine a compensating waveform equal in amplitude to the double-frequency transient component, and that is anti-phase to the double-frequency transient component. Step 540 may include causing the power converter 110 to generate the compensating waveform such that the waveform and the compensating waveform superpose, and the double-frequency transient component of the waveform and the compensating waveform destructively interfere, leaving the steady-state component that is delivered to the electrical load 106.

In keeping with the descriptions of the present disclosure, processing circuitry 114 may be composed of one or more processors alone or in combination with one or more memories 118. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in memory (of the same or another apparatus).

Processing circuitry 114 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as, or otherwise include, one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

Memory 118 is generally any piece of computer hardware that is capable of storing information such as, for example, data, computer programs (e.g., computer-readable program code 120) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a solid-state drive (SSD), flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

As indicated above, computer-readable program code 120 may be stored in memory 118, and executed by processing circuitry 114 that is thereby programmed, to implement functions of an apparatus such as computing device 122, the method, system(s), subsystem(s), tools and/or their respective elements described herein. As may be appreciated, any suitable program code instructions may be loaded onto a computer or other programmable apparatus from a computer-readable storage medium to produce a particular machine, such that the particular machine becomes a means for implementing the functions specified herein. These program code instructions may also be referred to as software and may be stored in a computer-readable storage medium that can direct a computer, processing circuitry, or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry, or other programmable apparatus to configure the computer, processing circuitry, or other programmable apparatus to execute operations to be performed on or by the computer, processing circuitry, or other programmable apparatus.

Retrieval, loading, and execution of the program code instructions may be performed sequentially such that one instruction is retrieved, loaded, and executed at a time. In some example implementations, retrieval, loading, and/or execution may be performed in parallel such that multiple instructions are retrieved, loaded, and/or executed together. Execution of the program code instructions may produce a computer-implemented process such that the instructions executed by the computer, processing circuitry, or other programmable apparatus provide operations for implementing functions described herein.

Execution of instructions by processing circuitry, or storage of instructions in a computer-readable storage medium, supports combinations of operations for performing the specified functions. In this manner, the power system 100 may include processing circuitry 114 and a computer-readable storage medium or memory 118 coupled to the processing circuitry, where the processing circuitry is configured to execute computer-readable program code 120 stored in the memory. It may also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure provided herein may come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for limiting double-frequency internal power distortion in a power system, the method comprising:
   receiving an input voltage from a voltage source at a power converter from which an output power is provided to an electrical load;
   measuring the output power having a first waveform comprising both a steady-state component and a double-frequency transient component;
   executing computer-readable program code, via processing circuitry, to determine a compensating waveform equal in amplitude to the double-frequency transient component, and that is anti-phase to the double-frequency transient component; and
   causing the power converter to generate the compensating waveform such that the first waveform and the compensating waveform superpose, and the double-frequency transient component of the first waveform and the compensating waveform destructively interfere, leaving the steady-state component that is delivered to the electrical load.

2. The method of claim 1, wherein the power system includes a capacitor connected to and between the power converter and the electrical load.

3. The method of claim 2, wherein the output power is measured on an output side of the capacitor.

4. The method of claim 3, wherein measuring the output power comprises:
   measuring a voltage across the capacitor, and measuring a current across the capacitor; and
   determining the output power from the measured voltage and the measured current.

5. The method of claim 1, wherein the computer-readable program code is executed to implement an equivalent circuit to express and thereby determine the compensating waveform, each correction signal in the equivalent circuit corresponding to a respective signal in the power system.

6. The method of claim 5, wherein the correction signal is equal in amplitude and anti-phase to the respective signal that is the double-frequency transient component of the waveform of the output power.

7. The method of claim 6, wherein the equivalent circuit is a double-frequency circuit having an alternating current (AC).

8. The method of claim 1, wherein the steady-state component is delivered to the electrical load as a sinusoidal voltage.

9. The method of claim 8, wherein the power system includes a capacitor connected to and between the power converter and the electrical load, and a power inverter connected to and between the capacitor and the electrical load, and the sinusoidal voltage is delivered to the electrical load from the power inverter.

10. A power system comprising:
    a power converter configured to receive an input voltage from a voltage source, and provide an output power to an electrical load; and
    processing circuitry coupled to the power converter, the processing circuitry configured to at least:
      measure the output power having a first waveform comprising both a steady-state component and a double-frequency transient component;
      execute computer-readable program code to determine a compensating waveform equal in amplitude to the double-frequency transient component, and that is anti-phase to the double-frequency transient component; and
      cause the power converter to generate the compensating waveform such that the first waveform and the compensating waveform superpose, and the double-frequency transient component of the first waveform and the compensating waveform destructively interfere, leaving the steady-state component that is delivered to the electrical load.

11. The power system of claim 10 further comprising a capacitor connected to and between the power converter and the electrical load.

12. The power system of claim 11, wherein the processing circuitry is configured to measure the output power on an output side of the capacitor.

13. The power system of claim 12, wherein the processing circuitry configured to measure the output power comprises the processing circuitry configured to:
measure a voltage across the capacitor, and measuring a current across the capacitor; and
determine the output power from the measured voltage and the measured current.

14. The power system of claim 10, wherein the computer-readable program code is executed to implement an equivalent circuit to express and thereby determine the compensating waveform, each correction signal in the equivalent circuit corresponding to a respective signal in the power system.

15. The power system of claim 14, wherein the correction signal is equal in amplitude and anti-phase to the respective signal that is the double-frequency transient component of the waveform of the output power.

16. The power system of claim 15, wherein the equivalent circuit is a double-frequency circuit having an alternating current (AC).

17. The power system of claim 10, wherein the steady-state component is delivered to the electrical load as a sinusoidal voltage.

18. The power system of claim 17 further comprising a capacitor connected to and between the power converter and the electrical load, and a power inverter connected to and between the capacitor and the electrical load, the power inverter configured to deliver the sinusoidal voltage to the electrical load.

19. A computer-readable storage medium for limiting double-frequency internal power distortion in a power system that includes a power converter configured to receive an input voltage from a voltage source, and provide an output power to an electrical load, the computer-readable storage medium being non-transitory and having computer-readable program code stored therein that, executed by processing circuitry, causes the processing circuitry to at least:
measure output power from the power converter to an electrical load, the output power having a first waveform comprising both a steady-state component and a double-frequency transient component;
determine a compensating waveform equal in amplitude to the double-frequency transient component, and that is anti-phase to the double-frequency transient component; and
cause the power converter to generate the compensating waveform such that the first waveform and the compensating waveform superpose, and the double-frequency transient component of the first waveform and the compensating waveform destructively interfere, leaving the steady-state component that is delivered to the electrical load.

20. The computer-readable storage medium of claim 19, wherein the computer-readable program code executed by the processing circuitry further causes the processing circuitry to implement an equivalent circuit to express and thereby determine the compensating waveform, each correction signal in the equivalent circuit corresponding to a respective signal in the power system.

* * * * *